United States Patent [19]

Miller et al.

[11] 3,991,235

[45] Nov. 9, 1976

[54] METHOD OF COATING METAL SUBSTRATES

[75] Inventors: John J. Miller; Richard E. Baus, both of Warminster; Sheldon N. Lewis, Willow Grove, all of Pa.

[73] Assignee: Rohm and Haas Company, Philadelphia, Pa.

[22] Filed: Nov. 22, 1974

[21] Appl. No.: 526,351

Related U.S. Application Data

[62] Division of Ser. No. 360,856, May 16, 1973, abandoned.

[52] U.S. Cl.............................. 427/195; 427/185; 428/463; 428/522; 428/539
[51] Int. Cl.² ..................... B05D 3/02; B32B 15/08; B22B 27/30
[58] Field of Search................ 260/851, 856, 80.75; 427/195, 185; 428/463, 461, 523, 522, 539

[56] References Cited
UNITED STATES PATENTS

| | | | |
|---|---|---|---|
| 3,272,785 | 9/1966 | Lewis et al.................. | 260/80.75 X |
| 3,364,060 | 1/1968 | Welzel et al................. | 260/80.75 X |
| 3,366,590 | 1/1968 | Taft............................. | 260/80.75 X |
| 3,598,770 | 8/1971 | Moore et al................. | 260/80.75 X |
| 3,669,942 | 6/1972 | Westrenen et al........... | 260/80.75 X |
| 3,732,190 | 5/1973 | Balle et al.................... | 260/80.75 X |
| 3,784,501 | 1/1974 | Pettit ............................ | 260/851 X |
| 3,787,340 | 1/1974 | Labana et al................ | 260/80.75 X |
| 3,790,513 | 2/1974 | Victorious .................... | 260/856 |
| 3,879,357 | 4/1975 | Wingler et al................. | 260/80.75 |

*Primary Examiner*—Ronald H. Smith
*Assistant Examiner*—Shrive P. Beck

[57] ABSTRACT

Polymeric materials are disclosed which comprise a hydroxyalkyl ester of acrylic acid or methacrylic acid, a monoethylenically $\alpha,\beta$-unsaturated carboxylic acid, and an alkyl ester or esters of acrylic and/or methacrylic acid are partially neutralized, isolated, and powdered to give useful powder coating compositions.

The compositions are particularly adapted to provide coatings on metals, a method for accomplishing this being disclosed.

8 Claims, No Drawings

METHOD OF COATING METAL SUBSTRATES

This is a division of application Ser. No. 360,856 filed May 16, 1973, now abandoned.

This invention relates to partially-neutralized polymers containing hydroxyl and carboxyl functionality, to methods of preparing the polymers, and to the use of the polymers in powder coating compositions.

Conventional systems for coating substrates such as metals, glass, wood, and the like generally use polymers which are dissolved or dispersed in liquids. Systems formulated with volatile solvents or dispersants have a number of disadvantages, including problems of air pollution by solvent vapors, added cost of using solvent as a carrier for the polymer, need for adequate ventilation, potential fire hazard, toxicity, problems of viscosity control requiring the use of a low solids content, and need for using repeated coatings to obtain a suitable film thickness. Furthermore, many polymers with desirable coating properties, such as nylons, polyolefins, chlorinated polyethers, and fluorocarbons, have not been successfully applied from solvent systems because of incompatibility or insolubility.

Powder coating systems have been found to overcome or minimize these problems. Generally, powder coating can be defined as a process for depositing an essentially solventless powder capable of being fused or cured into a coherent, protective, and durable coating, onto any substrate, particularly conductive substrates. Powder coatings, particularly those applied to substrates which have a difference in electrostatic charge from the powder, have the advantage of providing excellent uniformity of coatings, even over edges and corners, without sagging, orange peel, or drip marks. However, it is often difficult to achieve good melt flow characteristics with many polymers. To be a suitable powder coating, the melting point of the polymer must be sufficiently high to provide powders at room temperature, yet low enough to melt and flow at reasonable curing temperatures. Furthermore, thermosetting polymer systems must melt and flow before crosslinking begins so that a smooth and uniform finish will be obtained. As will be noted from the following description and the examples, the sole crosslinking means which provides the thermosetting function is provided by functional groups in the monomers entering into the acrylic polymer of the invention.

It has now been found that a partially-neutralized polymeric material containing hydroxyl functionality and acid functionality produces powder coatings which cure effectively in the presence of pigment and have a desirable balance of melt flow and cure characteristics. The polymeric materials used in making the powder coating compositions of the invention comprise a polymer or polymers derived from:

1. about 1 to about 30% by weight, and preferably about 5 to about 10% by weight, of a ($C_2$–$C_8$)hydroxyalkyl ester of acrylic acid or methacrylic acid or mixture of ($C_2$–$C_8$)hydroxyalkyl esters of acrylic acid and/or methacrylic acid;
2. about 1 to about 30% by weight, and preferably about 4 to about 6% by weight, of a monoethylenically $\alpha,\beta$-unsaturated carboxylic acid, or mixture of monoethylenically $\alpha,\beta$-unsaturated carboxylic acids; and
3. about 55 to about 98% by weight, and preferably about 84 to about 91% by weight, of a ($C_1$–$C_{18}$)alkyl ester of acrylic acid or methacrylic acid, or mixture of ($C_1$–$C_{18}$)alkyl esters of acrylic acid or methacrylic acid, or mixture of a ($C_1$–$C_{18}$)alkyl ester or esters of acrylic acid or methacrylic acid with up to about 60% by weight of the mixture of an additional copolymerizable $\alpha,\beta$-ethylenically unsaturated monomer.

To obtain polymeric materials having this composition, either polymers having both hydroxyl functionality and acid functionality or blends of polymers individually having hydroxyl functionality or acid functionality can be used. The polymeric materials of the invention will generally have a weight average molecular weight of about 5000 to about 16000, preferably about 10000 to about 12000, as determined by gel permeation chromatography.

To produce the powder coating compositions of the present inventions, these polymeric materials are reacted with a strong base, so that about 7 to about 95%, preferably about 30 to about 70%, of the carboxylic acid groups are neutralized to carboxylate groups. To accomplish this conversion, the polymeric materials are generally partially neutralized to a pH of about 5 to 10, preferably about 7.5 to 9.0, and then converted to a powdered form. Thus, in the powder coating compositions themselves, the polymers will contain both carboxylic acid groups and neutralized carboxylate groups. When in unneutralized form, the powdered polymers will not cure effectively in the presence of pigment, such as titanium dioxide, or when steel is used as the coating substrate.

Among the ($C_1$–$C_{18}$)alkyl esters of acrylic acid and methacrylic acid which can be used to make the polymeric materials of the invention are methyl acrylate, ethyl acrylate, propyl acrylate, isopropyl acrylate, butyl acrylate, isobutyl acrylate, sec-butyl acrylate, n-amyl acrylate, isoamyl acrylate, hexyl acrylate, 2-ethylhexyl acrylate, octyl acrylate, 3,5,5-trimethylhexyl acrylate, decyl acrylate, dodecyl acrylate, hexadecyl acrylate, octadecyl acrylate, octadecenyl acrylate, n-amyl methacrylate, sec-amyl methacrylate, hexyl methacrylate, 2-ethylbutyl methacrylate, octyl methacrylate, 3,5,5-trimethylhexyl methacrylate, decyl methacrylate, dodecyl methacrylate, hexadecyl methacrylate, octadecyl methacrylate, butoxyethyl acrylate or methacrylate or other alkoxyethyl acrylate or methacrylate, methyl methacrylate, ethyl methacrylate, propyl methacrylate, isopropyl methacrylate, butyl methacrylate, sec-butyl methacrylate, and t-butyl methacrylate, t-amyl methacrylate, t-butyl or t-amyl acrylate, cyclohexyl acrylate or methacrylate, and the like. Mixtures of these esters can also be used. The preferred acrylic acid and methacrylic acid esters are the ($C_1$–$C_4$)alkyl esters of acrylic and methacrylic acid. Up to about 60% by weight of the ester can be replaced by other $\alpha,\beta$-ethylenically unsaturated monomers, such as styrene, ethylene, butadiene, vinyl chloride, vinylidene chloride, vinyl acetate, acrylonitrile, methacrylonitrile, acrylamide, methacrylamide, and the like. Preferably, however, no other such monomer is used.

Among the ($C_2$–$C_8$)hydroxyalkyl esters of acrylic acid and methacrylic acid which can be used to make the polymeric materials of the invention are both monohydroxyalkyl esters and polyhydroxyalkyl esters, including 2-hydroxyethyl acrylate and methacrylate, 2-hydroxypropyl acrylate and methacrylate, 3-hydroxypropyl acrylate and methacrylate, 2-hydroxybutyl acrylate and methacrylate, 3-hydroxybutyl acrylate and methacrylate, 4-hydroxybutyl acrylate and methacrylate, 5-hydroxyamyl acrylate and methacrylate, 6- hydroxyhexyl acrylate and methacrylate, 8-hydroxyoctyl acrylate and methacrylate, 2,3-dihydroxypropyl acrylate and methacrylate, 2,3-dihydroxybutyl acrylate and methacrylate and the like. Mixtures of these hydroxyalkyl esters can also be used. The preferred hydroxyalkyl esters are 2-hydroxyethyl methacrylate and 2-hydroxypropyl methacrylate.

Among the monoethylenically $\alpha,\beta$-unsaturated carboxylic acids which can be used to make the polymeric materials of the invention are acrylic acid, methacrylic acid, $\alpha$-chloroacrylic acid, itaconic acid, crotonic acid, aconitic acid, maleic acid, fumaric acid, and the like. Half acid esters of the dicarboxylic acids can also be used, such as methyl hydrogen itaconate, butyl hydrogen itaconate, ethyl hydrogen maleate, and the like. Mixtures of these acids can also be used. The preferred acids are acrylic acid and methacrylic acid. While an excess of either the hydroxyalkyl ester or the acid can be used in the polymeric materials of the invention, it is generally preferable to use approximately equimolar amounts of these two components.

The polymer materials used in making the powder coating compositions of the invention can be made by a wide variety of conventional addition polymerization methods, including bulk, solution, emulsion, suspension, or nonaqueous dispersion polymerization. Emulsion and solution polymerization are preferred. Both free radical or redox polymerization systems can be employed, using conventional free radical or redox catalysts and conventional chain transfer agents. The temperature at which the polymerization reaction is carried out will vary depending on reaction variables such as monomers, type of polymerization, catalyst and solvents, but will generally be in the range of about 50° to about 140° C.

To make the powder coating compositions, the polymeric materials are partially neutralized, isolated, and powdered. A wide variety of inorganic and organic bases can be used to effect partial neutralization of the carboxylic acid groups in the polymeric materials. Representative bases include sodium hydroxide, potassium hydroxide, barium hydroxide, sodium carbonate, and the like. The partially neutralized polymers can be powdered by any convenient technique, such as by coagulation, precipitation, freeze drying, spray drying, milling, or the like.

The powder coating compositions of the invention which comprise a powdered partially-neutralized polymer and, optionally, pigments, fillers, antioxidants, plasticizers, melt flow improvers, stabilizers, or other common additives, can be applied to a wide variety of substrates by any conventional technique, such as fluidized-bed coating, electrostatically-charged fluidized-bed coating, electrostatic spray or cloud coating, or the like. The principal commercial powder coating methods are fluidized-bed coating, electrostatically-charged fluidized-bed coating, and electrostatic spray or cloud coating. Fluidized-bed coating is carried out by dipping a preheated object into a bed of finely divided dry coating materials, generally followed by post-heating to provide a smooth coating. Coatings of 5 to 50 mils can readily be obtained by this method. Electrostatic fluidized-bed, spray, and cloud coating normally involve imparting a charge to the particles, followed by exposing the substrate, commonly grounded, to the mist, spray, or cloud of powdered coating resin. Alternatively, the object to be coated can be charged prior to the coating step. Usually, the particles are supplied with a negative charge, although some materials are most useful with a positive charge.

The powder coating compositions can be prepared by dry blending, melt mixing, solution mixing, or other conventional techniques and to form a free-flowing powder, resistant to sintering and agglomeration at fusing and curing temperatures. Among the substrates which can be coated are metal, including steel, glass, conductive wood, textiles, or paper, plastics, and the like. The powder coating compositions can be applied directly to the surface of the substrate itself, or over a primer layer which has previously been applied to improve adhesion of the coating. The coated substrate is then treated at a temperature of about 125° to about 225° C., preferably about 150° to about 180° C. to fuse and cure the coating. Generally, the fusing and curing step takes about 15 to about 60 minutes.

The following examples will further illustrate this invention but are not intended to limit it in any way. All temperatures are in degrees Centigrade and percentages by weight, unless otherwise stated.

EXAMPLE I 900 g. of ethyl acrylate, 850 g. of methyl methacrylate, 159.6 g. of hydroxyethyl methacrylate (94%), 100 g. of methacrylic acid and 60 g. of bromotrichloromethane are added to 17 g. of sodium lauryl sulfate dissolved in 866 g. of deionized water and the mixture is emulsified (Mixture A). Three grams of sodium lauryl sulfate and 3.7 g. of anhydrous sodium carbonate are dissolved in 1010 g. of deionized water in a 5000 ml. four-neck flask fitted with a reflux condenser, thermometer, and facilitates for agitation and nitrogen purging. The flask is purged with nitrogen for 15 minutes and heated to 76° C. Ten grams of sodium persulfate are dissolved in 50 g. of deionized water and added to the flask followed by 125 g. of Mixture A. Polymerization begins and the temperature is brought to 81°–82° C. and maintained for the remainder of the polymerization. Ten minutes after the addition of Mixture A, the gradual addition of the remainder of Mixture A is begun at a rate that requires 110 minutes for complete addition. Thirty minutes after the addition of Mixture A is complete the temperature is lowered to 60° C and 0.50 g. of 70% t-butyl hydroperoxide in 20 ml of deionized water and 0.40 g. of sodium formaldehyde sulfoxylate (Formopon) in 20 ml of deionized water are added. After 10 minutes, the product is cooled to 25° C and filtered through four-ply cheesecloth to give a product having a pH of 1.55, and total solids 51% by weight.

2500 g. of the above emulsion polymer is diluted with 500 g. of deionized water. The initial pH is 1.55. Forty g. of a 5% solution of sodium carbonate are slowly added with good agitation, to give a pH of 4.3, followed by 575 g. of 2.5% sodium hydroxide solution and 35 g. of deionized water to a final pH of 7.9, and total solids of 35%. This emulsion is spray-dried or freeze-dried to yield a powder which melts and flows to a continuous film at 175° C with a typical Tukon hardness of 11.9 KHN, and linear swelling ratio in dimethylformamide of 1.54.

EXAMPLE II a. Spray Drying

The emulsion of Example I is diluted to about 35% total solids, filtered and spray dried with an average inlet temperature of 115°–125° C and an outlet temperature of 50° C. If desired, 30 parts of titanium dioxide for each 70 parts of polymer may be blended with the emulsion prior to spray drying to yield a pigmented powder coating.

b. Freeze Drying

One hundred grams of the emulsion polymer of Example I, with or without titanium dioxide, are placed in a 300 ml. round bottom flask and frozen in an acetone-dry ice freezing mixture with constant rotation of the flask to evenly coat the inner wall of the flask. The flask is connected to a suitable vacuum pump and trap system to maintain a presence of 2 mm. of mercury or less over a period of 24 hours. After solvent removal is complete, a powder suitable for powder coating applications remains in the flask.

EXAMPLE III

Three hundred grams of butyl acrylate, 575 g. of methyl methacrylate, 79.8 g. of hydroxyethyl methacrylate (94%), 50 g. of methacrylic acid and 30 g. of bromotrichloromethane are added to 8.5 g. of sodium lauryl sulfate dissolved in 433 g. of deionized water and the mixture is emulsified (Mixture B). 1.5 g. of sodium lauryl sulfate is dissolved in 460 g. of deionized water in a 3000 ml. four-neck flask fitted with a reflux condenser, thermometer, and facilities for agitation and nitrogen purging. The flask is purged with nitrogen for 15 minutes and heated to 76° C. Five grams of sodium persulfate are dissolved in 50 g. of deionized water and added to the flask followed by 62.5 g. of Mixture B. Polymerization begins and the temperature is brought to 81°–82° C and maintained for the remainder of the polymerization. Ten minutes after the initial addition of Mixture B, the gradual addition of the remainder of Mixture B is begun at a rate that requires 110 minutes for complete addition. Thirty minutes after the addition of Mixture B is complete, the temperature is lowered to 60° C and 0.29 g. of 70% t-butyl hydroperoxide in 20 g. of deionized water and 0.20 g. of sodium formaldehyde sulfoxylate (Formopon) in 20 ml of deionized water are added. After 10 minutes, the product is cooled to 25° C. and filtered through four-ply cheesecloth to give a product having a pH of 1.0 and total solids of 51% by weight.

The emulsion is neutralized by the procedures of Example I to a pH of 9.0 and is spray-dried or freeze dried to yield a powder which melts and flows to a film at 175° C with a typical Tukon hardness of 13.2 KHN and swelling ratio in dimethylformamide of 1.9.

EXAMPLE IV

Nine hundred grams of methylene chloride is charged to a partially evacuated two-liter reaction vessel capable of withstanding at least 100 PSIG and fitted with facilities for agitation, heating, cooling, and temperature measurement. The vessel is sealed and heated to 105° C where the pressure is about 85 PSIG. A monomer mixture of 192.5 g. of butyl acrylate, 420 g. methyl methacrylate, 56 g. 2-hydroxyethyl methacrylate (94%), 35 g. methacrylic acid, and 32.2 g. t-butyl peroctoate is prepared and gradually added to the reaction vessel over a period of 80 minutes. The pressure at this point is about 92 PSIG. After the addition of the monomer mixture is complete, the reaction is held for 30 minutes at 105° C and then, of 1.4 g. t-butyl peroctoate in 130 g. of methylene chloride is added over a period of 10 minutes. The reaction is then held for 30 minutes at 105° C and cooled to 25° C. The pressure, about 14 PSIG, is vented and the product is removed from the reaction vessel and filtered to give a product having a total solids of 40%, a viscosity of 260 cps, and a conversion of 96%.

The product is then neutralized by adding to 7½ 1000g. of the product (40% polymer solids) with agitation a 10% by weight solution of potassium hydroxide to give a pH of about 7 to about 10½ for the product.

EXAMPLE V

A monomer mixture is prepared by combining 250 g. butyl acrylate, 625 g. methyl methacrylate, 80 g. 2-hydroxyethyl methacrylate (94%), 50 g. of methacrylic acid, and 15 g. of benzoyl peroxide catalyst. In a 3000 ml. four-neck flask fitted with a reflux condenser, thermometer, and facilities for heating and agitation, 255 g. of n-butyl acetate and 876 g. toluene are combined and heated to reflux temperature (114° C) with moderate agitation. The monomer mixture is gradually added to the refluxing solvent in the flask over a period of 110 minutes. After the monomer addition, the temperature is held at reflux for 30 minutes. At the completion of the hold period, solution of 2 g. benzoyl peroxide in 100 g. toluene is added over a period of 30 minutes. The reaction is then again held at reflux for 30 minutes followed by cooling to room temperature. The product has total solids of 44.2%, and a viscosity of 1980 cps. The product is then neutralized as in Example IV.

EXAMPLE VI

A monomer mixture is prepared by combining 275 g. butyl acrylate, 600 g. methyl methacrylate, 80 g. β-hydroxyethyl methacrylate (94%) and 50 g. methacrylic acid. To this mixture 30 g. of benzoyl peroxide and 10 g. of dodecylmercaptan are added. In a 3000 ml. four-neck flask fitted with a reflux condenser, thermometer, and facilities for heating and agitation, 296 g. of n-butyl acetate and 957 g. toluene are combined and heated to reflux temperature (114° C) with moderate agitation. The monomer mixture is gradually added to the refluxing solvent in the flask over a period of 110 minutes. After the monomer addition, the temperature is held at reflux for 30 minutes. At the completion of the hold period, a solution of 2 g. of benzoyl peroxide in 175 g. toluene is added over a period of 30 minutes. The reaction is then again held at reflux for 30 minutes followed by cooling to room temperature. The product has a total solids of 40.0%, and a viscosity of 230 cps. The product is then neutralized as in Example IV.

EXAMPLE VII

This example shows a typical procedure for isolating solution polymers of the invention by freeze drying techniques.

A 2000 ml., round bottomed flask is charged with 150 g. of the 40% solids polymer solution to be freeze dried. The polymer solution is evaporated to constant weight on a rotary evaporator, employing steam heating of the flask and a vacuum of 20 inches of mercury or less. The residue is dissolved in benzene and the evaporation procedure repeated. The residue is redissolved in benzene to a solution solids of 10%. The solution is frozen on the walls of the flask by rotating the flask at a 45° angle in a dry ice-acetone bath. The flask with its frozen contents is attached with suitable liquid trapping arrangements to a vacuum pump capable of maintaining at least 2 cm of mercury. The polymer is isolated as a light solid after 24 hours under vacuum. The solid is powdered and screened to yield a powder of 150 mesh or less.

EXAMPLE VIII

This example shows typical properties of polymers of the invention when applied as powder coatings.

To the polymers of Examples IV, V, and VI is added 1% of a melt flow improver, such as Modaflow, and the polymers are neutralized with potassium hydroxide or 2,4,6-tris(dimethylaminomethyl)phenol and freeze-dried from benzene as described in Example VII.

The freeze-dried powder is applied to grounded steel test panels with a GEMA model 71 Electrostatic Spray System (Interrad Corporation, Greenwich, Connecticut) at 50 KV nominal output voltage.

The powdered panels are then placed in an oven at 350° F., 375° F., or 400° F, to melt, flow, and cure, and the cured panels are evaluated by the following tests:

a. Print Resistance — Cheesecloth is placed on the cured coating, weights are applied to yield a pressure of 2 psi, and the system is warmed for 2 hours at 140° F. After cooling the imprint of the cloth is qualitatively rated none, trace, very light, light, medium, heavy, etc.

b. Cold Crack — The panel is subjected to strain induced by wide and cyclical variation in temperature. One cycle consists of immersion in a glycol-water bath at −60° F. for 3 minutes followed by immersion in a water bath at 150° F. for 3 minutes and examination of the film for cracking. The panels are rated on the number of cycles which they withstand without cracking.

Table I summarizes the properties of the polymers of Examples IV, V, VI, when applied as powder coatings and cured as described above at 350° F., 375° F., or 400° F.

TABLE II

| % KOH | % Total Acid Groups Neutralized (calc.) | pH | Swelling Ratio |
|---|---|---|---|
| 0 | 0 | 5.9 | soluble |
| 0.25 | 7 | 7.7 | 2.3 |
| 0.50 | 14 | 7.9 | 1.8 |
| 1.00 | 27 | 8.1 | 1.7 |
| 1.50 | 41 | 8.2 | 1.6 |
| 2.00 | 54 | 8.4 | 1.6 |
| 3.26 | 90 | 9.1 | 1.9 |
| 3.46 | 95 | 9.4 | 2.2 |
| 3.65 | 100 | 10.6 | 3.0 |
| 3.84 | 105 | 11.8 | soluble |
| 4.02 | 110 | 12.0 | soluble |

The above data shows that practical cure of the polymers of the invention occurs when about 7 to 95% of the total acid groups are neutralized, with optimum cure with about 30 to 70% of the total acid groups neutralized. When a pigment, such as titanium dioxide is added, similar cure characteristics of the polymers are found. When other polymers of the invention are neutralized as described above, similar cure and swelling ratios are obtained.

EXAMPLE X

This example shows the preparation of a typical powder coating paint using polymers of the invention.

A mixture of 723 g. of a solution polymer similar to that described in Example IV but at 41.5% solids, 1500 g. of rutile titanium dioxide and 777 g. of methylene chloride are milled for 16 hours in a one-gallon ceramic ball mill.

A mixture of 19,400 g. of the 41.5% solids solution polymer, 7,642 g. of the pigment concentrate prepared

TABLE I

| Polymer of Example No. | % Base | Cold Crack 30 Minute Cure | | | Print at 140° F. 30 Minute Cure | | |
|---|---|---|---|---|---|---|---|
| | | 350° F | 375° F | 400° F | 350° F | 375° F | 400° F |
| IV | 0.5% KOH | 1 | 1 | >10 | v. light | v. light | 0 |
| | 1.0% KOH | 1 | >10 | >10 | v. light | 0 | 0 |
| V | — | 1 | 1 | 1 | light | light | light |
| | 1% DMP* | 4 | 5 | 5 | v. light | v. light | v. light |
| | 3% DMP* | 1 | >10 | >10 | trace | 0 | 0 |
| VI | .25% KOH | 2 | 2 | 10 | light | v. light | v. light |
| | .50% KOH | 1 | >10 | >10 | v. light | trace | trace |
| | 1.00% KOH | >10 | >10 | >10 | 0 | 0 | 0 |

*2,4,6-tris(dimethylaminomethyl)phenol

When other neutralized polymers of the invention are applied to steel panels and cured, similar useful coatings are obtained.

EXAMPLE IX

This example shows the effect of varying levels of neutralization on cure of the polymers of the invention.

Following the procedure of Example IV, the unneutralized polymer of that example is treated with several different percentages (calculated on the weight of polymer) of potassium hydroxide. The neutralized polymers are then removably applied from solution to glass panels and cured at 175° C. The effectiveness of cure is then evaluated by determining the swell ratio of the cured film with an Ames gauge after immersion in dimethylformamide at 175° C for 60 minutes. Table II summarizes the results of these tests.

above, 176 g. of an equal weight mixture of Modaflow melt flow improver and methylene chloride, and a solution of 88.5 g. of potassium hydroxide in 206.5 g. of methanol is stirred in a five-gallon pail to provide a paint of 45.9% solids.

A portion of the above paint is reduced to 20% by addition of methylene chloride and spray dried in a Bowen conical bottom spray drier under the following conditions:

| Inlet Air Temperature | 67° C |
|---|---|
| Outled Air Temperature | 43° C |
| Air Feed Rate | 100 CFM |
| Paint Feed Rate (20%) | 110 ml./min. |
| Atomizer Type | 2-fluid nozzle, 55 No. 5 |
| Atomizer Pressure | 40 PSIG |

The particles of dry powdered paint are approximately spherical with particle size ranging from approximately 2 to 2.5 microns and has a volatile content of 1.5% by weight. It will be noted that the sole cross-linking of the examples is by means of functional groups in the acrylic polymers used.

It is to be understood that changes and variations may be made without departing from the spirit and scope of the invention as defined by the claims.

We claim:

1. In a method of coating a ferrous metal substrate, the steps of applying to said substrate a fluidized powdered polymeric material consisting essentially of polymeric material having units derived from:
   1. about 1 to about 30% by weight of a ($C_2$–$C_8$)-hydroxyalkyl ester of acrylic acid or methacrylic acid or a mixture of said hydroxyalkyl esters;
   2. about 1 to about 30% by weight of a monoethylenically $\alpha,\beta$-unsaturated carboxylic acid or a mixture of said carboxylic acids; and
   3. about 55 to about 98% by weight of a ($C_1$–$C_{18}$) alkyl ester of acrylic acid or methacrylic acid, or a mixture of said alkyl esters, or an admixture containing said mixture and up to about 60% by weight of the admixture of an additional copolymerizable $\alpha,\beta$-ethylenically unsaturated monomer or monomers, wherein about 7 to about 95% of the carboxylic acid groups of the polymeric material have been neutralized to carboxylate groups, the carboxylate groups thus being partially neutralized, and having been derived from a liquid composition having an alkaline pH, said salt groups being selected from sodium, potassium, and barium, and heating and curing said coating.

2. The method of claim 1 wherein the hydroxyalkyl ester is 2-hydroxyethyl methacrylate.

3. The method of claim 2 wherein the carboxylic acid is acrylic acid or methacrylic acid.

4. The method of claim 3 wherein the hydroxyalkyl ester is 2-hydroxyethyl methacrylate and the alkyl ester is a mixture of a ($C_1$–$C_4$) alkyl acrylate and methyl methacrylate.

5. The method of claim 4 wherein the ($C_1$–$C_4$) alkyl acrylate is ethyl acrylate.

6. The method of claim 4 wherein the ($C_1$–$C_4$) alkyl acrylate is butyl acrylate, and in which said carboxylate groups are sodium or potassium salts.

7. The method of claim 1 in which the composition comprises a pigment, containing titanium dioxide.

8. The method of claim 1 in which the polymeric material is a polymer of:
   1. about 1 to about 30% by weight of a ($C_2$–$C_8$)-hydroxyalkyl ester of acrylic acid or a mixture of said hydroxyalkyl esters;
   2. about 1 to about 30% by weight of a monoethylenically $\alpha,\beta$-unsaturated carboxylic acid or a mixture of said carboxylic acids; and
   3. about 55 to about 98% by weight of a ($C_1$–$C_{18}$) alkyl ester of acrylic acid or methacrylic acid or a mixture of said alkyl esters, wherein about 30 to about 70% of the carboxylic acid groups of the polymer have been neutralized to carboxylate groups, the carboxylate groups thus being partially neutralized, and having been derived from a liquid composition having an alkaline pH, said salt groups being selected from sodium, potassium, and barium.

* * * * *

UNITED STATES PATENT AND TRADEMARK OFFICE
CERTIFICATE OF CORRECTION

PATENT NO. : 3,991,235
DATED : November 9, 1976
INVENTOR(S) : J. J. Miller, R. E. Baus, S. N. Lewis It is certified that error appears in the above–identified patent and that said Letters Patent are hereby corrected as shown below:

Column 6, line 5, delete "7 1/2".

Column 6, line 8, "7" should be --7 1/2--.

Signed and Sealed this

Fourth Day of January 1977

[SEAL]

Attest:

RUTH C. MASON
*Attesting Officer*

C. MARSHALL DANN
*Commissioner of Patents and Trademarks*